United States Patent [19]

Dittmer et al.

[11] 4,334,516
[45] Jun. 15, 1982

[54] COLLAPSIBLE, PORTABLE BARBECUE GRILL

[76] Inventors: Ellen Dittmer, Urspringerstr. 2, 8021 Strasslach; Lothar Pietryga, Krüner Str. 43, 8000 München 70, both of Fed. Rep. of Germany

[21] Appl. No.: 93,814

[22] Filed: Nov. 13, 1979

[30] Foreign Application Priority Data

Nov. 15, 1978 [DE] Fed. Rep. of Germany ....... 2849626

[51] Int. Cl.³ .......................... F24C 1/16; A47J 37/00
[52] U.S. Cl. ................................. 126/9 R; 126/25 R
[58] Field of Search .............. 126/9 R, 9 B, 9 A, 25R

[56] References Cited

U.S. PATENT DOCUMENTS

| | | | |
|---|---|---|---|
| 1,173,145 | 2/1916 | Klunk | 126/9 R |
| 2,213,483 | 9/1940 | Benson | 126/9 R |
| 2,449,617 | 5/1944 | Gorman | 126/9 R |
| 2,467,480 | 4/1949 | Hudson | 126/9 B |
| 2,511,594 | 6/1950 | Loffredo | 126/9 B |
| 2,874,631 | 2/1959 | Cooksley | 126/9 B |
| 3,877,458 | 4/1975 | Allander | 126/9 R |

FOREIGN PATENT DOCUMENTS 2435801  7/1974  Fed. Rep. of Germany ..... 126/9 R

*Primary Examiner*—Samuel Scott
*Assistant Examiner*—Wesley S. Ratliff, Jr.
*Attorney, Agent, or Firm*—Omri M. Behr

[57] ABSTRACT

A portable barbecue grill which can be folded together to form a very flat package and the grill portion of which can be adjusted in different distances from the fuel tray. The device comprises a frame, two U-shaped double legs and two guide rails which can be folded parallel to the frame. It further comprises a rotisserie bar being capable of being inserted in the guide rails when in the unfolded position and by which the grill portion can be moved upwardly and downwardly with the aid of two chains.

11 Claims, 5 Drawing Figures

COLLAPSIBLE, PORTABLE BARBECUE GRILL

BACKGROUND OF THE INVENTION

1. Field of the Invention

The invention provides a collapsible, portable barbecue grill.

2. Description of the Prior Art

Usually in conventional barbecue grills the distance between fuel tray and grill cannot be varied. (comp. e.g. German Offenlegungsschrift 24 27 678 and 24 35 801 as well as German Utility Model 76 03 567) Therefore, these barbecue grills on the one hand are difficult to clean and will become dirty and unsightly very easily, and on the other hand it is not possible to control the heat that acts upon the grill stock. Moreover, the fire acts directly upon the grill stock, by which valuable flavour and food values may be destroyed and which may furthermore lead to the development of charred products that are injurious to health. Barbecue grills having a grill means that can be raised or lowered by means of chains have been known from German Utility Model 69 05 100 and from U.S. Pat. No,. 3,943,837, but these barbecue grills as a whole are either not stable or not collapsible. On the other hand, the abovementioned barbecue grill according to German Utility Model 76 03 567 is collapsible but apart from the disadvantages also mentioned above it is disadvantageous in that the fuel tray device is a trough with rigid panels that prevent the formation of a flat package.

SUMMARY OF THE INVENTION

It is, therefore, an object of the invention to provide a barbecue grill that can be folded into a flat package, which can easily be transported, is stable, easy to clean and admits a controlled influence of the heat upon the grill stock.

In accordance with the invention there is provided a collapsible, portable barbecue grill comprising a frame member with two U-shaped double legs hingably attached to the bottom side of the frame member, a grill means and a fuel tray device capable of being inserted in the frame member, which barbecue grill is characterized by two guide rails hingably attached to the upper side of the frame member, which guide rails can be locked together while hinged, a grip attached to the one side of the frame member, two holding bars extending beyond the frame member in the upward and downward direction and being attached to the side of the frame member facing the grip, and a rotisserie bar rotatably supported between the free ends of the guide rails, the rotisserie bar comprising a crank handle and a shift lock, the fuel tray device constituting a plate and the grill means comprising two guide noses engaging the guide rails, the grill means being further capable of being raised or lowered by means of two holding chains attached to the grill means and being windable around the rotisserie bar.

BRIEF DESCRIPTION OF THE DRAWINGS

A preferred embodiment of the invented barbecue grill is further described in more detail hereinafter with reference to the accompanying drawings in which.

DETAILED DESCRIPTION OF THE INVENTION

Figure 1:
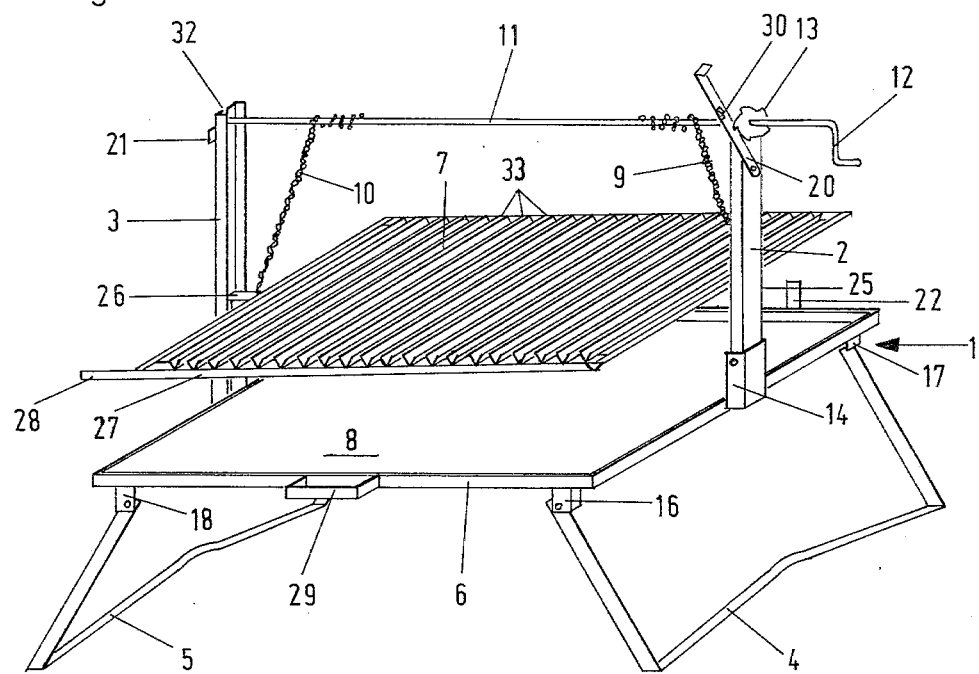
FIG. 1 is a perspective view of the invented barbecue grill in a position ready for use.

According to FIG. 1 the barbecue grill 1 comprises a frame 6 having two U-shaped double legs 4 and 5, two guide rails 2 and 3 mounted upright on two opposite sides of frame 6, furthermore a grill means 7 which is suspended into these rails and held by a rotisserie bar 11 inserted into the top portion of the guide rails and by holding chains 9 and 10, as well as a fuel tray 8 capable of being inserted into frame 6.

Figure 3:
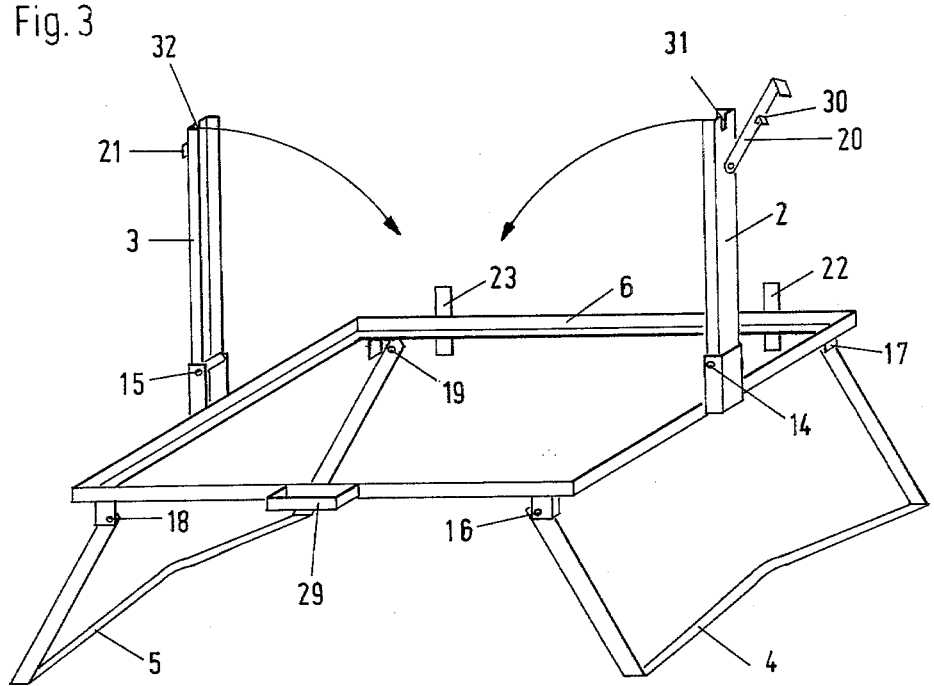
FIG. 3 is a perspective view of the invented barbecue grill with removed fuel tray and with demounted grill as well as demounted rotisserie bar.

Preferably frame 6 is rectangular and made of angle iron of L-shaped cross section, the vertex of the angle pointing in a downward and outward direction. At two opposite points each of the long sides of the frame the U-shaped double legs are attached each of which having a hinge 16,17,18,19 (FIG. 3) shortly below the frame and enabling the legs on the one hand to be swung out in order to achieve an optimal stability of the barbecue grill and on the other hand to be hinged inwardly i.e. towards the center of the frame.

The U-shape of the double legs in this embodiment should be understood in such a way that the two arms forming the U are not converging into a curve but have an almost horizontal connection piece between each other which is slightly bent upward in its center portion so that setting-up-points are formed almost below the angles of frame 6.

In the center of the two narrow sides of frame 6 two upwardly extending guide rails 2 and 3 made of U-shaped profile are provided which also have a hinge 14, 15 (FIG. 3) each located not far from frame 6. By means of these hinges it is possible to fold the guide rails from the one extreme, i.e. the vertical position inwardly to the other extreme position parallel to the frame. The guide rails 2 and 3 have a rectangular U-shaped cross section, the cross side between the U-arms pointing outwardly. At their free ends, the guide rails have slots 31 and 32 in the center of the cross side of the U-profile which are open to the free ends of the guide rails. Below these slots guide rail 2 bears at its outer side a locking bar 20 fixed at its one end in such a manner that it is rotatable round this fastening point whereas the other guide rail 3 has a latch 21 at the corresponding place. A likewise rectangular grill 7 is positioned between the guide rails above frame 6 and has grooved grate bars 33 with appropriate spaces between the bars suitable for bearing the grill stock and a discharge channel 27 attached to one long side of the grill below the ends of the grate bars 33 which channel has an elongated end 28 extending beyond the length of the grill. Each of the narrow sides of the grill 7 bears a guide nose 25,26 in its center which noses are formed such that they exactly fit into the U-profile of the guide rails 2 and 3.

Not far from these noses, but in a clearly excentric position supporting chains 9,10 are attached to each narrow side of grill 7 at the side opposite to the discharge channel 27, both chains being guided upwardly to a rotisserie bar 11 rotatably inserted in the slots 31 and 32 of the guide rails 2 and 3 resp. and being windable round the rotisserie bar. For this purpose the rotisserie bar 11 comprises a crank handle 12 at its one end and peripheric grooves (not shown in the drawings) at those points at which it is guided in the slots 31 and 32 of the guide rails 2 and 3 so that the rotisserie bar cannot inadvertantly slip out of its bearings while being rotated and thus a proper rotation is assured.

Out of the two chains 9 and 10 the one on the side of the elongated end 28 of the discharge channel 27 is a little longer than the other one, by which means as well as by the excentric attachment of the chains the grill 7 is sloped slightly downward on the one hand in the direction of the discharge channel 27 and on the other hand in the direction of the elongated end 28 of the discharge channel 27.

Figure 4:
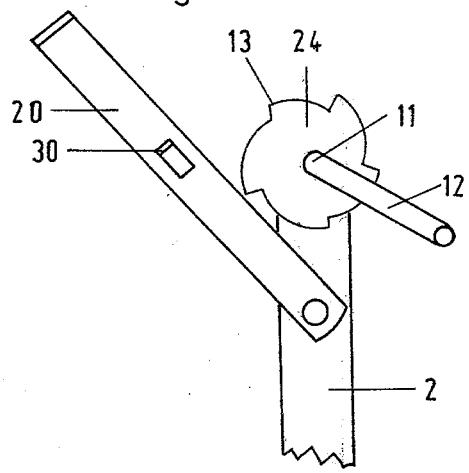

In order to stop the rotating motion there is a shift lock 13 attached to the rotisserie bar 11 outside one of the guide rails 2 or 3, which may have the shape of a gear rim 24 (FIG. 4) into which a stop pawl 30 can gear which is mounted either to the outer side of the same guide rail above the gear rim, if the guide rail bears an (not shown) extension, or to the locking bar 20. If the stop pawl is removed from the gear rim by resp. turning it backward around its fastening point or by turning the locking bar 20 aside, it does not offer any impediment to the unwinding of the chains 9 and 10 caused by the weight of the grill 7 and with that does not offer any impediment to the rotation of the rotisserie bar 11 so that the grill moves downwardly with its guide noses 25, 26 within the guide rails 2 and 3. Analogously, by rotating the crank handle 12 in the opposite direction the upward motion of the grill 7 is effected.

Furthermore, at one of the long sides of frame 6 a grip 29 is provided while at the opposite side of the frame there are two holding bars 22,23 (FIG. 3) extending beyond the frame 6 in the upward and downward direction and positioned on both sides of the center of the one long side of frame 6.

Figure 2:
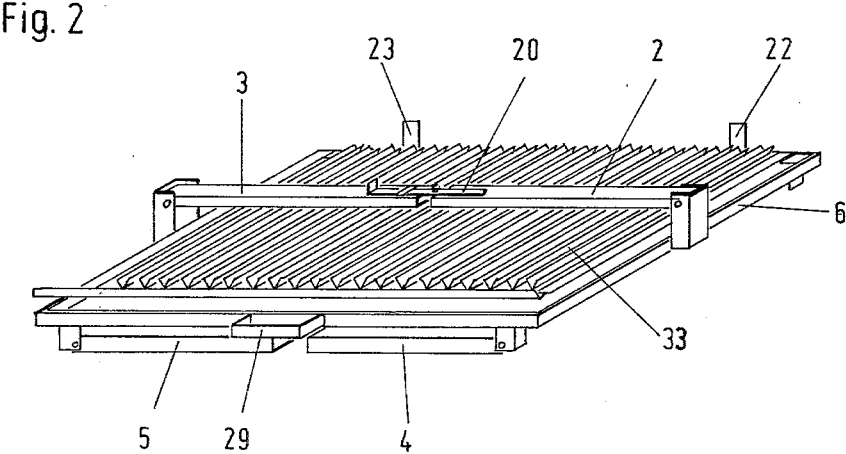
FIG. 2 is a perspective view of the invented barbecue grill in a folded together position
Figure 5:
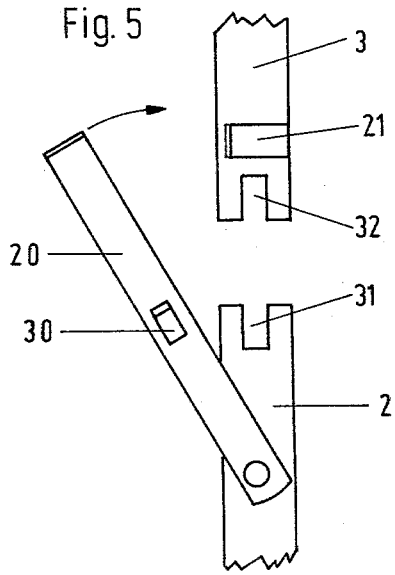
FIG. 4 is a plan view upon the locking mechanism of the rotisserie bar and FIG. 5 is a plan view on the locking mechanism of the folded barbecue grill.

For folding together the barbecue grill, first the grill 7 is lowered and then the rotisserie bar 11 together with the chains 9 and 10 is placed upon grill 7 now positioned within the frame. Thereafter the legs 4 and 5 and finally also the guide rails 2 and 3 are folded inwardly. Then the guide rails are fixed to each other by means of the locking bar 20 and the latch 21 (FIG. 5) so that all loose components are held between frame 6 and the locked guide rails 2 and 3. If one picks up the folded barbecue grill at grip 29, the loose elements cannot drop either, since they are prevented from doing so by the holding bars 22 and 23 (FIG. 2).

In a preferred embodiment of the grill according to the invention all parts that might come into touch with the grill stock including the grease dripping down or draining from the grill stock, such as grate bars 33, discharge channel 27 and fuel tray 8 are enamel-coated. Thus the quick folding and the good portability of the barbecue grill is further improved, for contrary to non-enamelled parts, the enamel-coated parts are easy to clean which is important for a clean and agreeable transport.

By means of the U-shaped double legs which are, above all, very far stayed, the barbecue grill is given a remarkably increased stability compared with conventional barbecue grills. That is why it stands well even on rough grounds such as terraces or lawn.

By folding the barbecue grill becomes that flat that its height is just one tenth of its length. Thus, it is as easy to carry as a suitcase. The folding can be done in a few seconds.

As the distance between fuel tray and grill can be varied one can also meet the circumstance that the heat of charcoal varies within a longer period of time.

The non-enamelled part of the barbecue grill is suitably made out of eloxadized iron. Both the enamel-coated parts of the barbecue grill and the eloxadized parts of the barbecue grill do not get rusty and therefore warrant a long service life of the grill.

The bars 33 of the grill 7 are preferably made out of angle iron with V-shaped cross-section as is known from the abovementioned German Offenlegungsschriften. Thus, it is guaranteed that the grease may drain quickly and completely in the grooves formed by the V-shaped bars and does not drip into the fire so that no substances can arise therefrom that may be injurious to health. The discharge channel 27 at the lower side of the grill is preferably also sloped, as described above, and a pot may be provided at its elongated end 28 in order to collect the draining grease.

We claim:
1. A collapsible, portable barbecue grill comprising:
  (a) a frame member having a pair of upwardly extending guide rails hingedly affixed at opposite ends thereof, and an inwardly extending peripheral lip, said guide rails being provided with receiving means at the distal free ends thereof;
  (b) a pair of generally U-shaped downwardly extending legs hingably affixed to said frame member;
  (c) fuel tray means removably receivable by said frame member and being supported on said inwardly extending frame lip for supporting fuel thereon;
  (e) a rotisserie bar journaled in said guide rail receiving means;
  (f) grill means disposed above said frame member and said fuel tray means, said grill means slidably cooperating with said guide rails for upward and downward movement; and
  (g) means affixed to said grill means and said rotisserie bar for moving said grill means upwardly and downwardly by rotation of said rotisserie bar.

2. A barbecue grill according to claim 1 wherein said guide rails may be folded inwardly and locked together retaining said grill means and said fuel tray means to said frame member.

3. A barbecue grill according to claim 1 wherein said rotisserie bar includes a crank handle and a gear affixed thereon and said guide rail includes a stop pawl for cooperating with said gear and adapted to restrain said gear from rotating.

4. A barbecue grill according to claim 1 wherein said means for moving said grill means upwardly and downwardly comprises a pair of chains disposed on opposite ends of said grill each having one end thereof affixed on said gril and the other ends thereof affixed on said rotisserie bar and windable therearound, said grill including outwardly extending protrusions adapted to cooperate with channels provided in said guide rails.

5. A barbecue grill according to claim 4 wherein said chains are disposed away from the central axis of said grill causing said grill to tilt towards said discharge channel.

6. A barbecue grill according to claim 5 wherein said chains are of different length, the chain proximate the outlet end of said discharge channel being longer, causing said grill to tilt towards said outlet end.

7. A barbecue grill according to claim 1 further including a handle disposed on one end of said frame and retaining bars affixed on the opposite end thereof.

8. A barbecue grill according to claim 1 wherein said fuel tray means is essentially a flat plate.

9. A barbecue grill according to claim 1 wherein the horizontal portion of said generally U-shaped legs are provided with its horizontal portion being bent upwardly proximate the center portion thereof.

10. A collapsible, portable barbecue grill comprising:
(a) a frame member having a pair of upwardly extending guide rails hingedly affixed at opposite ends thereof, said guide rails being provided with receiving means at the distal end thereof;
(b) a pair of generally U-shaped downwardly extending legs hingably affixed to said frame member;
(c) fuel tray means receivable by said frame member for supporting fuel thereon;
(d) a rotisserie bar journaled in said guide rail receiving means;
(e) grill means disposed above said frame member and said fuel tray means, said grill means slidably cooperating with said guide rails for upward and downward movement, said grill means including,
  (i) discharge channel means extending beyond the end of said grill receiving liquids from food cooked thereon and permitting discharge thereof, and
  (ii) a plurality of channel means extending across the said grill and terminating in said discharge channel for receiving liquid entering said plurality of channel means and discharging said liquid into said discharge channel; and
(f) means affixed to said grill means and said rotisserie bar for moving said grill means upwardly and downwardly by rotation of said rotisserie bar.

11. A collapsible, portable barbecue grill comprising:
(a) a frame member having a pair of upwardly extending guide rails hingedly affixed at opposite ends thereof, said guide rails being provided with receiving means at the distal ends thereof, one of said rails including a slidable locking bar affixed thereon proximate said distal end and said other guide rail including a latch thereon affixed proximate its distal end thereof for cooperating with said locking bar to lock said guide rails in a closed position;
(b) a pair of generally U-shaped downwardly extending legs hingably affixed to said frame member;
(c) fuel tray means receivable by said frame member for supporting fuel thereon;
(d) a rotisserie bar journaled in said guide rail receiving means;
(e) grill means disposed above said frame member and said fuel tray means, said grill means slidably cooperating with said guide rails for upward and downward movement; and
(f) means affixed to said grill means and said rotisserie bar for moving said grill means upwardly and downwardly by rotation of said rotisserie bar,
said guide rails retaining said grill means and said fuel tray means to said frame when in said closed position.

* * * * *